(12) United States Patent
Hsu et al.

(10) Patent No.: US 9,967,563 B2
(45) Date of Patent: May 8, 2018

(54) METHOD AND APPARATUS FOR LOOP FILTERING CROSS TILE OR SLICE BOUNDARIES

(71) Applicant: HFI Innovation Inc., Zhubei, Hsinchu County (TW)

(72) Inventors: Chih-Wei Hsu, Taipei (TW); Chia-Yang Tsai, New Taipei (TW); Yu-Wen Huang, Taipei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 652 days.

(21) Appl. No.: 14/374,918

(22) PCT Filed: Jan. 30, 2013

(86) PCT No.: PCT/CN2013/071108
§ 371 (c)(1),
(2) Date: Jul. 28, 2014

(87) PCT Pub. No.: WO2013/113274
PCT Pub. Date: Aug. 8, 2013

(65) Prior Publication Data
US 2015/0010091 A1 Jan. 8, 2015

Related U.S. Application Data

(60) Provisional application No. 61/594,457, filed on Feb. 3, 2012.

(51) Int. Cl.
*H04N 7/12* (2006.01)
*H04N 19/124* (2014.01)
(Continued)

(52) U.S. Cl.
CPC ......... *H04N 19/124* (2014.11); *H04N 19/117* (2014.11); *H04N 19/14* (2014.11);
(Continued)

(58) Field of Classification Search
CPC .. H04N 19/124; H04N 19/176; H04N 19/117; H04N 19/86; H04N 19/174; H04N 19/82; H04N 19/14; H04N 19/154
(Continued)

(56) References Cited

U.S. PATENT DOCUMENTS

| 7,460,596 B2 | 12/2008 | Kwon et al. | |
|---|---|---|---|
| 2004/0101059 A1* | 5/2004 | Joch | H04N 19/159 375/240.29 |
| 2009/0316793 A1* | 12/2009 | Yang | H04N 19/172 375/240.24 |

FOREIGN PATENT DOCUMENTS

| CN | 1694537 | 11/2005 |
|---|---|---|
| CN | 102165780 A | 8/2011 |

(Continued)

OTHER PUBLICATIONS

Bross, B., et al: "High Efficiency Video Coding (HEVC) Text Specification Working Draft 5;" Joint Collaborative Team on Video Coding (JCT/VC) of ITU-T SG16 WP3 and ISO/IEC JTC1/SC29/WG1; Nov. 2011; pp. 1-226.
(Continued)

*Primary Examiner* — Joseph Ustaris
*Assistant Examiner* — Jill Sechser
(74) *Attorney, Agent, or Firm* — Oblon, McClelland, Maier & Neustadt, L.L.P.

(57) ABSTRACT

A method and apparatus for loop filter processing of boundary pixels across a block boundary aligned with a slice or tile boundary is disclosed. Embodiments according to the present invention use a parameter of a neighboring slice or tile for loop filter processing across slice or tile boundaries according to a flag indicating whether cross slice or tile loop filter processing is allowed not. According to one embodiment of the present invention, the parameter is a quantiza-
(Continued)

tion parameter corresponding to a neighboring slice or tile, and the quantization parameter is used for filter decision in deblocking filter.

10 Claims, 3 Drawing Sheets

(51) Int. Cl.

| | | |
|---|---|---|
| *H04N 19/176* | (2014.01) | |
| *H04N 19/117* | (2014.01) | |
| *H04N 19/14* | (2014.01) | |
| *H04N 19/174* | (2014.01) | |
| *H04N 19/82* | (2014.01) | |
| *H04N 19/86* | (2014.01) | |
| *H04N 19/154* | (2014.01) | |

(52) U.S. Cl.
CPC ......... *H04N 19/174* (2014.11); *H04N 19/176* (2014.11); *H04N 19/82* (2014.11); *H04N 19/86* (2014.11); *H04N 19/154* (2014.11)

(58) Field of Classification Search
USPC .................................................. 375/240.29
See application file for complete search history.

(56) References Cited

FOREIGN PATENT DOCUMENTS

| | | |
|---|---|---|
| CN | 102223538 | 10/2011 |
| WO | 2011013580 A1 | 2/2011 |
| WO | 2011140960 A1 | 11/2011 |

OTHER PUBLICATIONS

Van der Auwera, G, et al.; "Support of Varying QP in Deblocking;" Joint Collaborative Team on Video Coding (JCT/VC) of ITU-T SG16 WP3 and ISO/IEC JTC1/SC29/WG1; Nov. 2011; pp. 1-5.

* cited by examiner

METHOD AND APPARATUS FOR LOOP FILTERING CROSS TILE OR SLICE BOUNDARIES

CROSS REFERENCE TO RELATED APPLICATIONS

The present invention claims priority to U.S. Provisional Patent Application, No. 61/594,457, filed on Feb. 3, 2012, entitled "Constrain QP availability at slice or tile boundaries". The U.S. Provisional Patent Application is hereby incorporated by reference in its entirety.

TECHNICAL FIELD

The present invention relates to video coding. In particular, the present invention relates to video coding techniques associated with loop filter processing at tile or slice boundaries.

BACKGROUND

Motion estimation is an effective inter-frame coding technique to exploit temporal redundancy in video sequences. Motion-compensated inter-frame coding has been widely used in various international video coding standards. The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate a compressed video bitstream. During the encoding process, coding artifacts are introduced, particularly by the quantization process. In order to alleviate the coding artifacts, in newer coding systems, additional processing is often applied to the reconstructed video to enhance picture quality. The additional processing is configured in an in-loop operation so that the encoder and decoder may derive the same reference pictures for proper operation.

FIG. 1 illustrates an exemplary adaptive inter/intra video coding system incorporating in-loop filter processing. For inter-prediction, Motion Estimation (ME)/Motion Compensation (MC) 112 is used to provide prediction data based on video data from other picture or pictures. Switch 114 selects Intra Prediction 110 or inter-prediction data from ME/MC 112 and the selected prediction data is supplied to Adder 116 to form prediction errors, also called prediction residues or residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image unit. The side information may also be processed by entropy coding to reduce required bandwidth. Accordingly, the side information data is also provided to Entropy Encoder 122 as shown in FIG. 1 (the motion/mode paths to Entropy Encoder 122 are not shown). When the inter-prediction mode is used, a previously reconstructed reference picture or pictures have to be used to form prediction residues. Therefore, a reconstruction loop is used to generate reconstructed pictures at the encoder end. Consequently, the transformed and quantized residues are processed by Inverse Quantization (IQ) 124 and Inverse Transformation (IT) 126 to recover the processed residues. The processed residues are then added back to prediction data 136 by Reconstruction (REC) 128 to reconstruct the video data. The reconstructed video data may be stored in Reference Picture Buffer 134 and used for prediction of other frames.

As shown in FIG. 1, incoming video data undergoes a series of processing in the encoding system. The reconstructed video data from REC 128 may be subject to various impairments due to the series of processing. Accordingly, various loop processing is applied to the reconstructed video data before the reconstructed video data is used as prediction data in order to improve video quality. In the High Efficiency Video Coding (HEVC) standard being developed, Deblocking Filter (DF) 130, Sample Adaptive Offset (SAO) 131 and Adaptive Loop Filter (ALF) 132 have been developed to enhance picture quality. The Deblocking Filter (DF) 130 is applied to boundary pixels and the DF processing is dependent on the underlying pixel data and coding information associated with the corresponding blocks. There is no DF-specific side information needs to be incorporated in the video bitstream. On the other hand, the SAO and ALF processing are adaptive, where filter information such as filter parameters and filter type may be dynamically changed according to the underlying video data. Therefore, filter information associated with SAO and ALF is incorporated in the video bitstream so that a decoder can properly recover the required information. Therefore, filter information from SAO and ALF is provided to Entropy Encoder 122 for incorporation into the bitstream. In FIG. 1, DF 130 is applied to the reconstructed video first; SAO 131 is then applied to DF-processed video; and ALF 132 is applied to SAO-processed video. However, the processing order among DF, SAO and ALF may be re-arranged. In H.264/AVC video standard, the loop filter processing only includes DF. In the High Efficiency Video Coding (HEVC) video standard being developed, the loop filter processing includes DF and SAO.

In HEVC Test Model Version 5.0 (HM-5.0), different image unit structures, including slice and tile, are introduced. A picture is partitioned into multiple slices or tiles, where the image unit partition is often aligned with boundaries of Largest Coding Units (LCUs). Within each picture, the processing sequence of the tiles may be according to raster scan order. Slices and tiles can be configured independently. Therefore, one slice may run across multiple tiles, and one tile may also run across multiple slices. Loop filter processing such as DF, SAO and ALF may depend on neighboring pixels. Accordingly, the loop filter processing for a current tile or slice may have to wait until some neighboring slices or tiles become available. There are two types of tiles: independent tiles and dependent tiles. Slices or independent tiles are mainly designed for parallel processing, where reconstructing LCUs (e.g. MV prediction, intra prediction, entropy coding) within one slice or tile does not need any data from other tiles. However, loop filtering can be applied across slice or tile boundaries or restricted to within a slice or a tile according to a flag. While in the mode that coding process is applied within the slice or independent tile, the loop filter processing may still need some information from a neighboring slice or tile. For example, when DF is applied across a block boundary, the DF process depends on the QP (quantization parameter) values from both sides of the block boundary. When DF is applied to a slice or tile boundary aligned with a block boundary, the DF process depends on the QP values on both sides of the slice or tile.

This will be a problem if the coding process is intended for not crossing the slice or tile boundary. Accordingly, it is desirable to develop a method and apparatus that can overcome dependency on parameter across a slice or tile boundary.

SUMMARY

A method and apparatus for loop filter processing of boundary pixels across a block boundary are disclosed. The block boundary has first pixels on a first side and second pixels on a second side of the block boundary. The loop filter processing is applied to the boundary pixels across the block boundary depends on a first parameter for the first pixels on the first side and a second parameter for the second pixels on the second side. Embodiments according to the present invention adaptively apply loop filter processing across slice or tile boundaries according to a flag indicating whether cross slice or tile loop filter processing is allowed or not. According to one embodiment of the present invention, the method comprises receiving reconstructed video data associated with a picture; determining a value of a cross-slice loop filter flag or a cross-tile loop filter flag corresponding to the slice or the tile respectively; and applying said loop filter processing to the boundary pixels across a slice or tile boundary aligning a block boundary according to the value of the cross-slice loop filter flag or the cross-tile loop filter flag, wherein said loop filter processing for the boundary pixels of the slice or tile boundary depends on both the first parameter for the first pixels inside the slice or tile and the second parameter for the second pixels outside the slice or tile.

The first parameter and the second parameter correspond to quantization parameters (QPs) on both sides of the block boundary. For a slice or tile, if the value of the cross-slice loop filter flag or the cross-tile loop filter flag indicates that no cross-slice or cross-tile filter loop processing is allowed, the quantization parameter corresponding to a neighboring slice or tile is set unavailable for the loop filter processing. For a slice or tile, if the value of the cross-slice loop filter flag or the cross-tile loop filter flag indicates that cross-slice or cross-tile filter loop processing is allowed, the quantization parameter corresponding to a neighboring slice or tile is provided for the loop filter processing. In this case, the loop filter processing is applied to the boundary pixels of the slice or tile using an average quantization parameter of the first quantization parameter and the second quantization parameter.

DETAILED DESCRIPTION

The coding process in HEVC is applied to Largest Coding Units (LCU) of an image. The LCU is adaptively partitioned into coding units using quadtree. In each leaf CU, DF is performed for each 8×8 block in HEVC Test Model Version 5.0 (HM-5.0). The DF is applied to 8×8 block boundaries. For each 8×8 block, horizontal filtering across vertical block boundaries is first applied, and then vertical filtering across horizontal block boundaries is applied.

Figure 1:
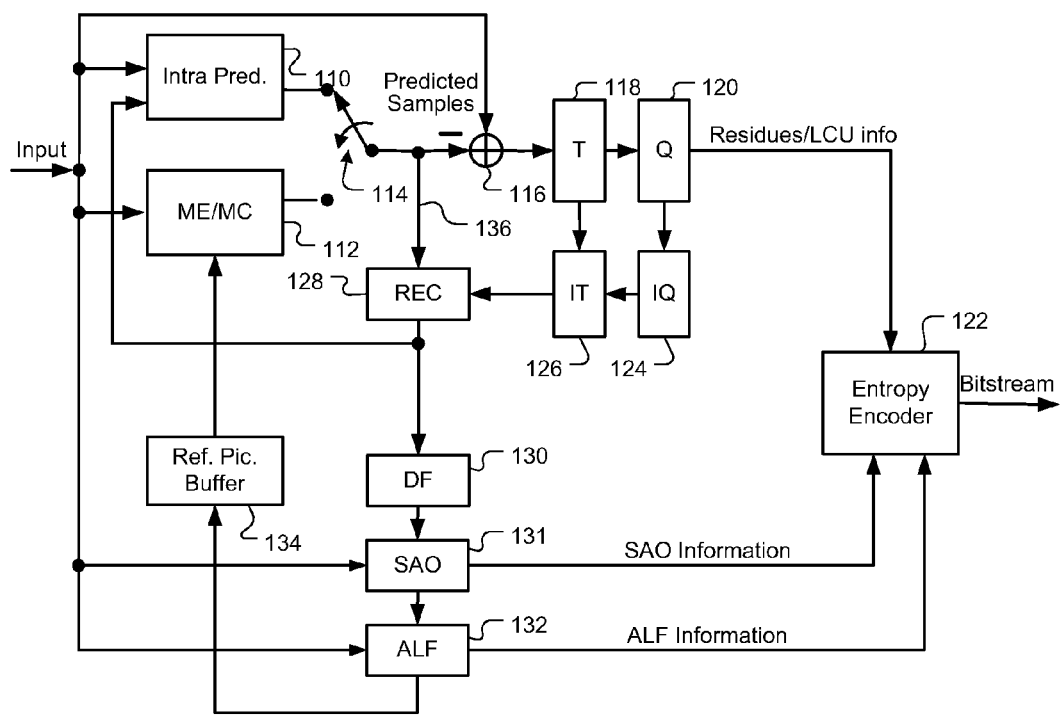
FIG. 1 illustrates an exemplary video coding system using Inter/Intra prediction, where loop filter processing including Deblocking Filter (DF), Sample Adaptive Offset (SAO) and Adaptive Loop Filter (ALF) is incorporated.
Figure 2:
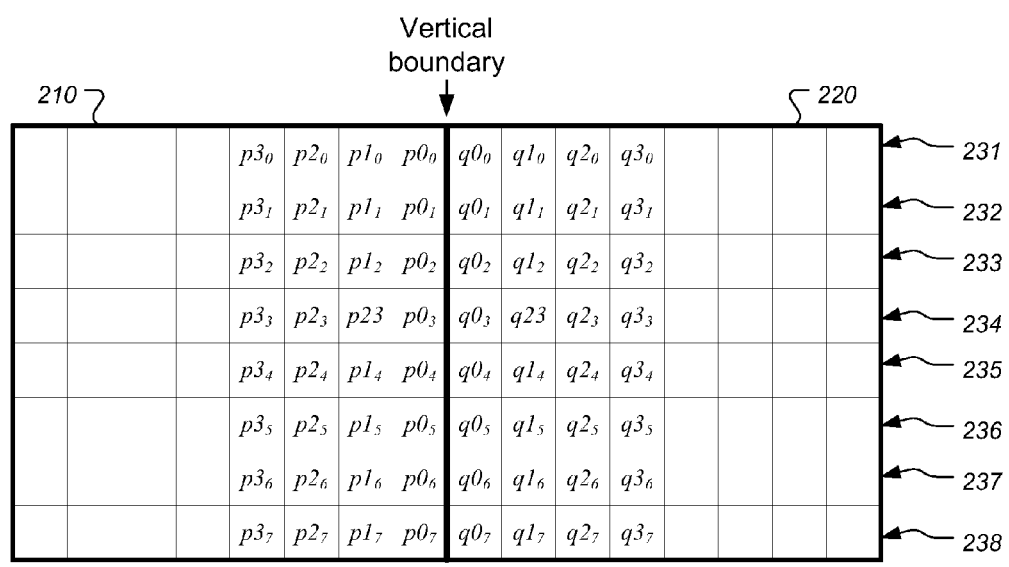
FIG. 2 illustrates pixels on both sides of a vertical boundary involved in Deblocking Filter.

FIG. 2 shows an example of a vertical boundary to be filtered between two blocks 210 and 220 shown as thick boxes in FIG. 2, where each block consists of 8×8 pixels. Eight pixel lines associated with the two neighboring blocks are labeled from 231 through 238 as shown in FIG. 2. Four pixels on each side of the vertical boundary are labeled as (p3i, p2i, p1i, p0i, q0i, q1i, q2i, q3i), where i is the index for the pixel lines and i=0, . . . , 7. In this example, block 210 and block 220 can be two prediction units (PUs) or transform units (TUs). The deblocking process includes steps of determining filter ON/OFF, determining filter strength and applying deblocking filter. The filter ON/OFF decision checks if the transition at the boundary is a natural edge or is caused by coding artifacts. If it is a natural edge, the filter is turned OFF to preserve the sharpness of the picture associated with the respective boundary. Otherwise, the deblocking filter is turned ON to reduce the artifacts. The filter ON/OFF decision is first performed for all block boundaries of the respective picture area to be filtered. If a boundary is to be filtered, filter strength decision, i.e., selecting a strong or weak filter, will be determined. Subsequently, a deblocking filter with the determined filter strength is applied to the boundary to be filtered. The deblocking process is termed as deblocking for convenience in this disclosure. The deblocking process is also called deblocking filter in the field of video coding. The filter used for deblocking is also called deblocking filter. Therefore, the term deblocking filter may refer to the deblocking process or the filter used for deblocking depending on the context.

In order to keep the computational complexity low, the filter ON/OFF decision according to conventional HEVC is determined based on only two pixel lines. For example, in HM-5.0, line 2 (corresponding to pixel line 233 in FIG. 2) and line 5 (corresponding to pixel line 236 in FIG. 2) are used. Edge activity measure, d is computed based on pixels in lines 2 and 5:

$$d=|p2_2-2p1_2+p0_2|+|q2_2-2q1_2+q0_2|+|p2_5-2p1_5+p0_5|+|q2_5-2q1_5+q0_5|. \quad (1)$$

If the Edge activity measure d is smaller than a pre-defined threshold $\beta$, the corresponding block boundary will be filtered. The pre-defined threshold, $\beta$ is related to quantization parameter (QP). If a block boundary is determined to be filtered, the weak/strong filter decision is then performed line by line according to the conditions:

$$d<\beta>>2, \quad (2)$$

$$|p3_i-p0_i|+|q3_i-q0_i|<\beta>>3, \text{ and} \quad (3)$$

$$|p0_i-q0_i|<5 \cdot tc+1, \quad (4)$$

where tc is another pre-defined threshold related to QP to avoid over-filtering pixels. If all three conditions above are satisfied, a strong filer is selected. Otherwise a weak filter is selected. While the above example describes DF processing for a vertical block boundary, the DF processing for a horizontal block boundary can be derived similarly.

The slice or tile boundary can be aligned with a block boundary. In this case, the vertical block 210 is also a vertical slice/tile boundary. The two sides of a block boundary are referred as a first side and a second side. The boundary pixels on the first side are referred as first pixels and the boundary pixels on the second side are referred as second pixels. For a given slice or tile, boundary pixels on one side of the slice- or tile-aligned block boundary are within the given slice or tile, and boundary pixels on the other side of the slice- or tile-aligned block boundary are outside the given slice or tile. For convenience, the boundary pixels ($q0_i$, $q1_i$, $q2_i$, $q3_i$) are designated as the first pixels and the corresponding side is designated as the first side. Similarly, the boundary pixels ($p3_i$, $p2_i$, $p1_i$, $p0_i$) are designated as the second pixels and the corresponding side is designated as the second side. Further, the first pixels may be designated as the boundary pixels being processed by DF and the first pixels are located inside a current slice or a tile. Therefore, the second pixels on the second side of the block boundary are located in a neighboring slice or tile, i.e., outside the current slice or tile.

As mentioned above, both thresholds $t_C$ and $\beta$ are dependent on the quantization parameter QP. The QP values $QP_Q$ and $QP_P$ associated with the respective first pixels and second pixel of the block boundary may differ. Therefore, in HM-5.0, the final QP is formed by averaging $QP_Q$ and $QP_P$ and the averaged QP is used to derive $t_C$ and $\beta$ thresholds. At a slice or tile boundary, $QP_Q$ and $QP_P$ are associated with two neighboring slices or tiles. If intra slice or tile processing is selected, the QP value from the other slice or tile ($QP_P$ or $QP_Q$) will not be available.

In HM-5.0, each slice may be independently processed without any dependency on any other slices. One flag, NonCrossSliceLoopFilterFlag, is used to indicate whether the loop filter processing is allowed to apply across the slice boundary. Similarly, both independent and dependent tiles are supported, where each independent tile is processed without dependency on any other tiles. One flag, NonCrossTileLoopFilterFlag, is used to indicate whether the loop filter processing is allowed to apply across the tile boundary. When non-cross slice or tile operations are specified, the usage of data, including the quantization parameter QP from other slice or tile is prohibited. Therefore, the QP of pixels outside the slice or tile is unavailable for deriving the average QP for DF processing at a slice or tile boundary.

Embodiments according to the present invention use the parameter associated with a neighboring slice according to the cross-slice loop filter flag. For example, in the case of a slice boundary, $QP_P$ (i.e., quantization parameter for the second pixels outside the slice) is set to unavailable for loop filter processing on pixels within the slice if the non-cross-slice loop filter flag, NonCrossSliceLoopFilterFlag is true (i.e., no cross-slice loop filter processing is allowed). In this case, loop filter processing may not be applied to boundary pixels across the slice boundary. The quantization parameter $QP_Q$ for the first pixels on the first side of the block boundary (inside the slice) may be used as QP for loop filter processing applied to the first pixels, i.e., $QP=QP_Q$. If the non-cross-slice loop filter flag, NonCrossSliceLoopFilterFlag is false (i.e., cross-slice loop filter processing is allowed), $QP_P$ is set to available. In this case, the average of the first quantization parameter and the second quantization parameter may be used as the quantization parameter for loop filter processing on boundary pixels of the slice boundary, i.e., $QP=\frac{1}{2}(QP_P+QP_Q)$.

For tiles, there are independent tiles and dependent tiles. For independent tiles, a loop filter flag, NonCrossTileLoopFilterFlag is used to indicate whether the loop filter processing is applied across the tile boundary or not. Embodiments according to the present invention also use the parameter associated with a neighboring tile according to the cross-tile loop filter flag. For example, in the case of an independent tile boundary for a tile, $QP_P$ (i.e., quantization parameter for the second pixels outside the tile) is set to unavailable for loop filter processing applied inside the tile if the non-cross-tile loop filter flag, NonCrossTileLoopFilterFlag is true (i.e., no cross-tile loop filter processing is allowed). In this case, loop filter processing may not be applied to boundary pixels across the tile boundary. The quantization parameter $QP_Q$ for the first pixels inside the tile may be used as QP for loop filter processing applied to the first pixels, i.e., $QP=QP_Q$. If the non-cross-tile loop filter flag, NonCrossTileLoopFilterFlag is false (i.e., cross-tile loop filter processing is allowed), $QP_P$ is set to available. In this case, the average of the first quantization parameter and the second quantization parameter may be used as the quantization parameter for loop filter processing, i.e., $QP=\frac{1}{2}(QP_P+QP_Q)$.

When dependent tiles are used, information from a previous tile is allowed for loop filter processing of the current tile. Therefore, $QP_P$ is always set to available regardless of whether NonCrossTileLoopFilterFlag is true or false.

Figure 3:
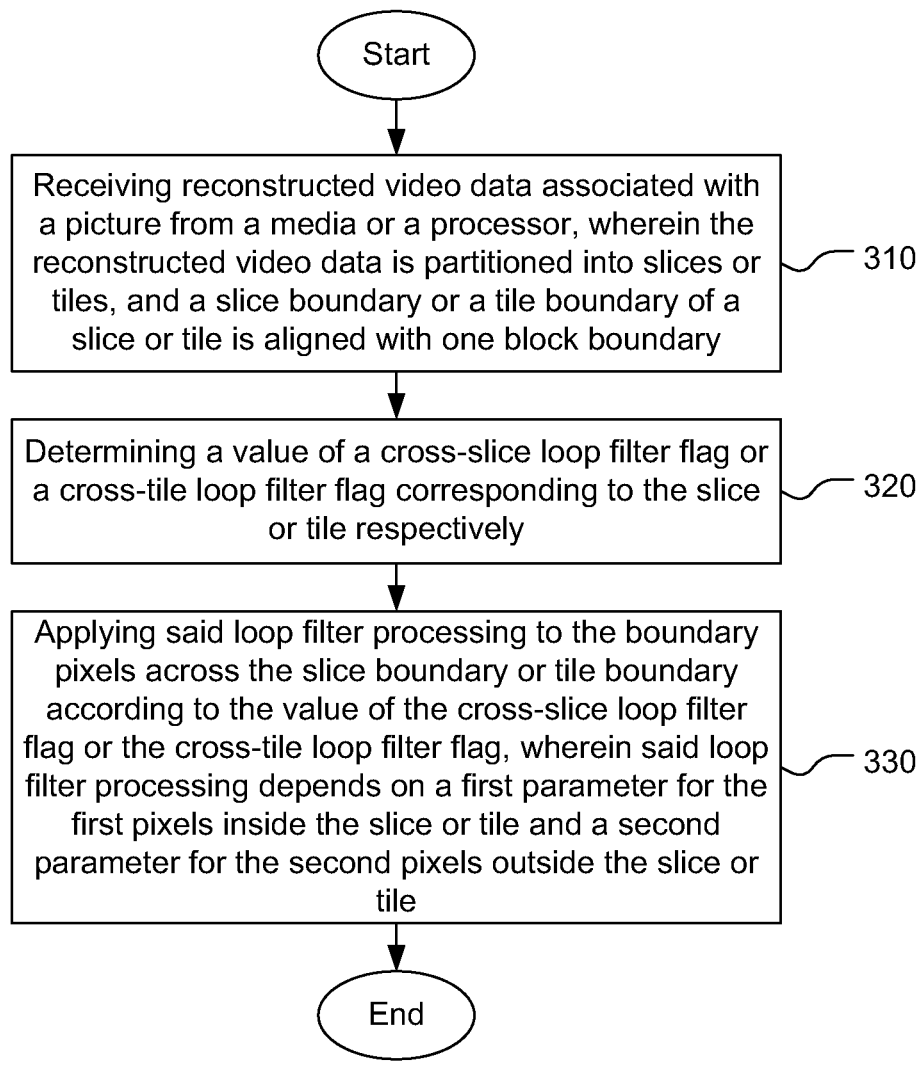
FIG. 3 illustrates an exemplary flowchart of cross slice or tile loop filter processing incorporating an embodiment of the present invention.

The loop filter processing method which uses the quantization parameter associated with a neighboring slice or tile according to the cross-slice or cross-tile loop filter flag described above can be used in a video encoder as well as a video decoder. FIG. 3 illustrates an exemplary flowchart of an encoder or a decoder incorporating an embodiment of the present invention. The reconstructed video data associated with a picture is received from a media or a processor as shown in step 310, wherein the reconstructed video data is partitioned into one or more slices or tiles, wherein a slice boundary or a tile boundary of a slice or tile is aligned with one block boundary. The reconstructed video data may be retrieved from storage such as a computer memory of buffer (RAM or DRAM). The reconstructed video data may also be received from a processor such as a controller, a central processing unit or a digital signal processor that reconstructs the video data. The value of the cross-slice loop filter flag or the cross-tile loop filter flag corresponding to the slice or the tile is determined respectively in step 320. The loop filter processing is then applied to the boundary pixels of the slice or tile boundary according to the value of the cross-slice loop filter flag or the cross-tile loop filter flag as shown in step 330, wherein the loop filter processing for the boundary pixels depends on a first parameter of the first pixels inside the slice or tile and a second parameter of the second pixels outside the slice or tile.

The flowchart shown above is intended to illustrate an example of a loop filtering processing method at slice or tile boundaries for a video encoder and a decoder incorporating an embodiment of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of in-loop filter processing for boundary pixels across a block boundary, the method comprising:
   receiving reconstructed video data associated with a picture from a media or a processor, the reconstructed video data being partitioned into slices or tiles and having the boundary pixels across the block boundary that corresponds to a slice boundary or a tile boundary, and the boundary pixels including first pixels on a first side of the block boundary and second pixels on a second side of the block boundary;
   determining a value of a cross-slice loop filter flag or a cross-tile loop filter flag corresponding to a first slice or a first tile on the first side of the block boundary, wherein the cross-slice loop filter flag or the cross-tile loop filter flag is incorporated in a picture level of compressed video bitstream;
   when the value of the cross-slice loop filter flag or the cross-tile loop filter flag indicates that cross-slice filtering or cross-tile filtering is applicable, determining a first filter decision for the in-loop filter processing to be applied to the boundary pixels across the block boundary;
   when the value of the cross-slice loop filter flag or the cross-tile loop filter flag indicates that cross-slice filtering or cross-tile filtering is not applicable, determining a second filter decision for the in-loop filter processing to be applied to the boundary pixels across the block boundary; and
   applying the in-loop filter processing within coding loop to the boundary pixels of the reconstructed video data based on the determined filter decision,
   wherein
   the first filter decision is determined using both a first quantization parameter for the first pixels on the first side of the block boundary and a second quantization parameter for the second pixels on the second side of the block boundary, and
   the second filter decision is determined without using both the first quantization parameter and the second quantization parameter.

2. The method of claim 1, wherein the first filter decision is determined based on an average of the first quantization parameter and the second quantization parameter.

3. The method of claim 1, wherein the in-loop filter processing is performed using a deblocking filter that is configurable based on the first quantization parameter or the second quantization parameter.

4. The method of claim 1, wherein the second filter decision is determined using one, without using both, of the first quantization parameter and the second quantization parameter.

5. An apparatus of in-loop filter processing for boundary pixels across a block boundary, the apparatus comprising:
   means for receiving reconstructed video data associated with a picture from a media or a processor, the reconstructed video data being partitioned into slices or tiles and having the boundary pixels across the block boundary that corresponds to a slice boundary or a tile boundary, and the boundary pixels including first pixels on a first side of the block boundary and second pixels on a second side of the block boundary;
   means for determining a value of a cross-slice loop filter flag or a cross-tile loop filter flag corresponding to a first slice or a first tile on the first side of the block boundary, wherein the cross-slice loop filter flag or the cross-tile loop filter flag is incorporated in a picture level of compressed video bitstream; and
   means for applying the loop filter processing by:
      when the value of the cross-slice loop filter flag or the cross-tile loop filter flag indicates that cross-slice filtering or cross-tile filtering is applicable, determining a first filter decision for the in-loop filter processing to be applied to the boundary pixels across the block boundary;
      when the value of the cross-slice loop filter flag or the cross-tile loop filter flag indicates that cross-slice filtering or cross-tile filtering is not applicable, determining a second filter decision for the in-loop filter processing to be applied to the boundary pixels across the block boundary; and
      applying the in-loop filter processing within coding loop to the boundary pixels of the reconstructed video data based on the determined filter decision,
   wherein
   the first filter decision is determined using both a first quantization parameter for the first pixels on the first side of the block boundary and a second quantization parameter for the second pixels on the second side of the block boundary, and
   the second filter decision is determined without using both the first quantization parameter and the second quantization parameter.

6. The apparatus of claim 5, wherein the first filter decision is determined based on an average of the first quantization parameter and the second quantization parameter.

7. The apparatus of claim 5, wherein the means for applying the in-loop filter processing includes a deblocking filter that is configurable based on the first quantization parameter or the second quantization parameter.

8. A video coding device, comprising:
a processing circuit configured to:
- receive reconstructed video data associated with a picture, the reconstructed video data being partitioned into slices or tiles and having boundary pixels across a block boundary that corresponds to a slice boundary or a tile boundary, and the boundary pixels including first pixels on a first side of the block boundary and second pixels on a second side of the block boundary;
- determine a value of a cross-slice loop filter flag or a cross-tile loop filter flag corresponding to a first slice or a first tile on the first side of the block boundary, wherein the cross-slice loop filter flag or the cross-tile loop filter flag is incorporated in a picture level of compressed video bitstream;
- when the value of the cross-slice loop filter flag or the cross-tile loop filter flag indicates that cross-slice filtering or cross-tile filtering is applicable, determine a first filter decision for an in-loop filter processing to be applied to the boundary pixels across the block boundary;
- when the value of the cross-slice loop filter flag or the cross-tile loop filter flag indicates that cross-slice filtering or cross-tile filtering is not applicable, determine a second filter decision for the in-loop filter processing to be applied to the boundary pixels across the block boundary; and
- apply the in-loop filter processing within coding loop to the boundary pixels of the reconstructed video data based on the determined filter decision, wherein the first filter decision is determined using both a first quantization parameter for the first pixels on the first side of the block boundary and a second quantization parameter for the second pixels on the second side of the block boundary, and the second filter decision is determined without using both the first quantization parameter and the second quantization parameter.

9. The video coding device of claim 8, wherein the first filter decision is determined based on an average of the first quantization parameter and the second quantization parameter.

10. The video coding device of claim 8, wherein the processing circuit, when applying the loop filter processing, is configured to function as a deblocking filter that is configurable based on the first quantization parameter or the second quantization parameter.

* * * * *